Patented June 7, 1927.

1,631,728

UNITED STATES PATENT OFFICE.

WILLIAM HOSKINS, OF CHICAGO, ILLINOIS.

ART OF TREATING WOOD.

No Drawing.   Application filed April 21, 1924. Serial No. 708,009.

The present invention relates to improvements in wood products, and will be fully understood from the following description thereof.

In accordance with the present invention, wood articles, either pre-formed or in the form of articles which are later to be reduced to the desired form, are impregnated, at least superficially and preferably completely, with melted sulphur, which is permitted to cool and harden in the pores of the wood material. In carrying out the invention, the sulphur is melted by a slow and gradual application of heat, preferably in a vessel in which a minimum surface is exposed, and is held at a temperature but slightly above its melting point, say about 120° C. The wood to be impregnated is then immersed in the melted sulphur until the desired degree of impregnation is secured. The wood is then removed and allowed to cool, the sulphur solidifying in situ. By carrying out the impregnating operation in a vacuum, the rate of impregnation of the wood by the sulphur is materially increased. Thus, with articles up to, say, two inches in thickness, it is found that the use of a vacuum of about twenty-five inches, reduces the time required for complete impregnation to less than one-half, and in some cases, to about one-fourth that required at ordinary atmospheric pressure.

The rate of impregnation, and likewise the proportion of sulphur required for complete impregnation varies with the character of wood employed. Thus, the softer woods such as bass wood, poplar, gum, and the like are impregnated more rapidly and require a higher proportion of sulphur than do the closer grained and harder woods, such as maple, hickory and the like. Thus it has been found that the quantity of sulphur required to saturate various woods is as follows:

Bass wood; 100 to 200% of the weight of the wood.
Poplar; 100 to 200%.
Gum; 75 to 150%.
Willow; 40 to 100%.
Walnut; 30 to 60%.
Maple; 25 to 65%.
Hickory; 20 to 40%.

In carrying out the invention, the wood may be only superficially impregnated, if desired, particularly in the case of articles which have already been shaped to the desired form.

The sulphur impregnated wood may be stained, varnished, painted, glued, or otherwise handled in the same manner as untreated wood. It will be understood, of course, that in such operation stains and pigments must be employed which are not chemically affected by sulphur. If desired, a suitable dye or staining agent may be incorporated in the sulphur with which the wood is impregnated, such dyes being selected as are not affected by sulphur at its melting point or at slightly higher temperatures. For example, metallic sulfides may be dissolved in the sulphur, cadmium sulfide producing a yellow color and copper sulfide a black color. Organic dyes which which do not react with sulphur may also be used.

By impregnating with sulphur in accordance with this invention, it acquires a greatly hardened surface and becomes substantially inert toward acid and alkali and is substantially impervious to water and other liquids. It greatly increases the ease of working, particularly in the case of soft grained woods, and hardens them to such an extent that uneven working, due to the grain, substantially disappears. Thus, blocks of soft wood, such as bass, poplar and gum, after impregnation with sulphur, may be used in the production of engraving blocks, and permit of the formation of fine lines to an extent not hitherto possible in wood blocks.

I have found that the impregnation of thin boards of wood, both solid and laminated, with sulphur, renders them especially well adapted for use as panels or supports in the construction of radio sets. The resulting panels or boards have high dielectric qualities, are unaffected by humidity changes, are easily worked by ordinary wood working tools, and may be so treated as to greatly beautify the sets in the construction of which they are employed.

Among the articles which I may produce by the use of wood impregnated with sulphur in accordance with this invention, are macaroni sticks, piano parts, engraving blocks, engineers' scales and rules, acid tanks, brush backs, buttons, billiard cues, bowling balls, bowling pins and the like. By the use of wood treated in accordance with my invention, relative inexpensive and soft woods otherwise unsuitable may be employed, and in use, the resulting articles are unaffected by moisture, humidity, acids, or alkalies.

I claim as my invention:

1. A radio panel consisting of wood in its natural state superficially impregnated with sulphur.

2. A radio panel consisting of wood, in its natural state impregnated with sulphur.

WILLIAM HOSKINS.